United States Patent [19]
Gray, Jr. et al.

[11] Patent Number: 5,495,912
[45] Date of Patent: Mar. 5, 1996

[54] HYBRID POWERTRAIN VEHICLE

[75] Inventors: Charles L. Gray, Jr., Pickney; Karl H. Hellman; Michael J. Safoutin, both of Ann Arbor, all of Mich.

[73] Assignee: The United States of America as represented by the Administrator of the U.S. Environmental Protection Agency, Washington, D.C.

[21] Appl. No.: 253,944

[22] Filed: Jun. 3, 1994

[51] Int. Cl.$^6$ .................................................. B60K 26/00
[52] U.S. Cl. ........................ 180/165; 180/65.4; 180/307; 60/414
[58] Field of Search ..................................... 180/165, 305, 180/306, 307, 308, 65.1, 65.2, 65.3, 65.4; 60/413, 414, 418, 420; 364/424.1, 426.01; 74/665 A, 665 B

[56] References Cited

U.S. PATENT DOCUMENTS

| | | | |
|---|---|---|---|
| 4,350,220 | 9/1982 | Carman | 180/165 |
| 4,372,414 | 2/1983 | Anderson et al. | 180/165 |
| 4,993,780 | 2/1991 | Tanaka et al. | 180/165 |
| 5,024,489 | 6/1991 | Tanaka et al. | 180/165 |
| 5,088,041 | 2/1992 | Tanaka et al. | 180/165 |

*Primary Examiner*—Richard M. Camby
*Attorney, Agent, or Firm*—Lorusso & Loud

[57] ABSTRACT

Engine output speed is controlled for optimum efficiency by adjustment of input speed of a continuously variable transmission (CVT). Where power in excess of that provided by the engine is required, additional power is input to the drivetrain from a fluidic motor driven by fluid pressure stored in an accumulator. In driving conditions where the engine, operating at optimum efficiency, produces power in excess of that demanded by of the vehicle, the fluidic motor is reversed for operation as a pump and excess engine power is utilized to drive the pump and store energy in the accumulator in the form of fluid pressure. A CPU determines power output required of the engine as a sum of that indicated by a sensor which senses power demanded of the vehicle by a driver and an increment of power required to maintain the pressure of the accumulator above a threshold amount. An engine speed controller controls the rotary speed of the engine output, to produce the required total power output, by changing the input speed of the CVT. In order to maintain optimum engine efficiency, a memory associated with the CPU is stored with maps correlating values for optimum engine speed with values for engine output power and the optimum engine speed is read from the map by reference to the determined total requirement for engine output power. Optionally, the vehicle may include first and second engines with the second engine providing a power assist under driving conditions demanding power in excess of that available from the primary engine in combination with the fluidic motor. The invention also includes a method of operating the system in order to achieve the objective of optimum engine efficiency.

16 Claims, 5 Drawing Sheets

HYBRID POWERTRAIN VEHICLE

BACKGROUND OF THE INVENTION

1. Field of the Invention

The invention is a unique automotive hybrid powertrain design that allows highly efficient use of energy generated by an integrated internal or external combustion engine. The field of application is in propulsion systems for motor vehicles.

2. The Prior Art

The growing utilization of automobiles greatly adds to the atmospheric presence of various pollutants including greenhouse gases such as carbon dioxide. For this reason, there has been a quest for approaches to improve the efficiency of fuel utilization for automotive powertrains. Current powertrains typically average only about 10 to 15% thermal efficiency.

Conventional automotive powertrains result in significant energy loss, make it difficult to effectively control emissions, and offer limited potential to bring about major improvements in automotive fuel economy. Conventional powertrains consist of an internal combustion engine and a simple mechanical transmission having a discrete number of gear ratios. Due to the inefficiencies described below, about 85% to 90% of the fuel energy consumed by such a system is wasted as heat. Only 10%–15% of the energy is available to propel the vehicle, and much of this is dissipated as heat in braking.

Much of the energy loss is due to a poor match between engine power capacity and average power demand. The load placed on the engine at any given instant is directly determined by the total road load at that instant, which varies between extremely high and extremely low load. To meet acceleration requirements, the engine must be many times more powerful than the average power required to propel the vehicle. The efficiency of an internal combustion engine varies significantly with load, being best at higher loads near peak load and worst at low load. Since engine operation experienced in normal driving is nearly always at the low end of the spectrum, the engine must operate at poor efficiency much of the time, even though some conventional engines have peak efficiencies in the 35% to 40% range.

Another major source of energy loss is in braking. In contrast to acceleration which requires delivery of energy to the wheels, braking requires removal of energy from the wheels. Since an internal combustion engine can only produce and not reclaim energy, a conventional powertrain is a one-way energy path. Braking is achieved by a friction braking system, which renders useless the temporarily unneeded kinetic energy of the vehicle by converting it to heat.

The broad variation in speed and load experienced by the engine in a conventional powertrain also makes it difficult to effectively control emissions because it requires the engine to operate at many different conditions of combustion. Operating the engine at more constant speed and load would allow much better optimization of any emission control devices, and the overall more efficient settings of the engine would allow less fuel to be combusted per mile traveled.

Conventional powertrains offer limited potential to bring about improvements in automotive fuel economy except when combined with improvements in aerodynamic drag, weight, and rolling resistance. Such refinements can only offer incremental improvements in efficiency, and can apply equally well with improved powertrains.

Hybrid vehicle systems have been investigated as a means to mitigate the foregoing inefficiencies. A hybrid vehicle system provides a "buffer" between the power required to propel the vehicle and the power produced by the internal combustion engine in order to moderate the variation of power demand experienced by the engine. The buffer also allows regenerative braking because it can receive and store energy from sources other than the engine. The effectiveness of a hybrid vehicle system depends on its ability to operate the engine at peak efficiencies and on the capacity and efficiency of the buffer medium. Typical buffer media include electric batteries, mechanical flywheels and hydraulic accumulators.

To use a hydraulic accumulator as the buffer, a hydraulic pump/motor is integrated into the system. The pump/motor interchangeably acts as a pump or motor. As a pump, the pump/motor uses engine or "braking" power to pump hydraulic fluid to an accumulator where it is pressurized against a volume of gas (e.g., nitrogen). As a motor, the pressurized fluid is released through the pump/motor, producing power.

There are two general classes of hydraulic hybrid vehicle systems. A "series" system routes all of the energy produced by the engine through a fluid power path and so it is the fluid power side that experiences the variable road load. This improves efficiency because the efficiency of the fluid power path is not as sensitive to the power demand variations, and because the engine is thus decoupled from road load, allowing it to operate at peak efficiency or be turned off. Series systems are relatively simple in concept and control, but have less efficiency potential than other systems because all energy must be converted to fluid power and back to mechanical power to propel the vehicle. They also depend on frequent on/off operation of the engine for optimum efficiency. "Parallel" systems split power flow between a direct, almost conventional mechanical drive line and a fluid power path. Thus, some of the energy is spared the conversion to fluid power and back again. The most common context for such systems are in a "launch assist" mode where the hydraulic system serves mainly to store braking energy and to redeliver it to assist in the next vehicle acceleration. The parallel system, because it requires both a conventional and a hydraulic power path to the wheels, tends to be more complex than the series system and more difficult to control for smoothness. Depending on the specific design, both series and parallel systems allow some reduction of engine size but both still tend to require a relatively large engine.

For example, U.S. Pat. No. 4,223,532 (Sep. 23, 1980), issued to Shiber, discloses a hydraulic hybrid transmission system which utilizes two pump/motors and is based on a theory that encourages intermittent engine operation.

SUMMARY OF THE INVENTION

Accordingly, it is an object of the present invention to provide a hybrid powertrain system which allows for significant reduction of size of the vehicle's internal combustion engine.

It is a further object of the present invention to provide a powertrain system which allows the vehicle's internal combustion engine to be constantly operated at near peak efficiency.

It is yet a further object of the present invention to provide a hybrid propulsion system wherein presently unneeded power generated by the internal combustion engine can be stored in a "buffer" for use to produce driving force (1) at such times when the internal combustion engine alone is insufficient to provide the output torque demanded of the vehicle and (2) at times of very low power demand when engine operation would be inefficient, e.g. in a traffic jam.

Still another object of the present invention is to provide a powertrain design that allows a more highly efficient use of energy generated by the internal combustion engine than heretofore possible.

Still another object of the present invention is to provide a hybrid powertrain propulsion system which allows for extreme variations in road load while maintaining high efficiency.

The present invention provides a unique "parallel" hybrid propulsion system and method of operation which meet the above-stated objectives. Specifically, the hybrid powertrain vehicle of the present invention includes a vehicle frame supported above a road surface by drive wheels rotatably mounted thereon. A primary engine, e.g. an internal or external combustion engine, mounted on the vehicle frame provides output engine power and an output shaft in a conventional manner. A power storage device is also mounted on the vehicle frame to serve as a "buffer", i.e. for storing and releasing braking and "excess" engine power. A first drive train serves to transmit the engine power to the drive wheels and includes a continuously variable transmission (CVT) having the usual movable pulley of variable effective diameter (or other multiple gear ratio transmission).

In the preferred embodiment, a reversible fluidic displacement means or "reversible pump/motor," is interposed between a fluid pressure accumulator and the first drivetrain to output motor power to the first drivetrain, driven by the accumulator fluid pressure in a first mode and to operate as a pump, driven by the first drivetrain, to store fluid pressure in the accumulator in a second mode. In other embodiments the power storage device could be, for example, the combination of a storage battery, generator/alternator and an electric motor.

A second drivetrain serves to connect the power storage device to the first drivetrain thereby defining a "parallel" propulsion system.

Control of the propulsion system is provided for, in part, by three sensors, i.e. a vehicle speed sensor, a power storage sensor, e.g. a pressure sensor for sensing fluid pressure within the accumulator and a torque (or power) demand sensor for sensing torque (or power) demanded of the vehicle by the driver, e.g. a sensor for "throttle" pedal position or "accelerator" pedal depression. A microprocessor includes comparing means for comparing the sensed value of stored power with a predetermined minimum value for stored power and for generating a demand signal upon a determination that the sensed value for stored power is at or below the predetermined minimum value. The microprocessor also includes a torque output determining means for determining an additional torque in accordance with the demand signal and for determining an engine output torque as the sum of the sensed torque demand and the additional torque. The microprocessor also includes an engine speed determining processor for determining an engine speed of optimum efficiency in accordance with the determined engine output torque and the sensed vehicle speed and for outputting a transmission signal, indicative of the determined engine speed. An engine speed control means controls the rotary speed of the output shaft of the engine by changing the gear ratio of the transmission. In the preferred embodiment this involves changing the effective diameter of the movable pulley of the CVT, responsive to the transmission signal output by the engine speed determining processor. An engine load controller controls engine power by controlling the fuel feed to the primary combustion engine responsive to the transmission signal. A mode controller serves to switch the power storage device between power storing and power release modes. In the preferred embodiment the mode controller serves both to convert operation of the fluid displacement means between the first and second modes of operation, responsive to the demand signal, and to vary the displacement of the fluid displacement means responsive to the sensed fluid pressure.

Optionally, a secondary, e.g. internal combustion, engine is mounted on the vehicle frame to provide for additional engine capacity which might be needed, for example, to climb a particularly steep grade. When a secondary engine is mounted on the vehicle, a secondary engine clutch is interposed between the output of the secondary engine and the first drive train for matching the output speed of the secondary engine with the output of the primary engine.

The propulsion system of the present invention optionally further includes a free wheel clutch interposed between the transmission (CVT) and the drive wheels for disengaging the drive wheels from the first drive train responsive to a signal indicating zero power demand.

In the present invention the propulsion system is controlled by sensing vehicle speed, sensing fluid pressure within a fluid pressure accumulator and sensing power demanded of the vehicle by the driver. A reversible fluidic displacement device (pump/motor) is switched between a pump mode and a motor mode responsive to torque demand and available fluid pressure stored in the accumulator. The sensed fluid pressure is compared with a predetermined minimum fluid pressure and, if determined to be below the predetermined fluid pressure, a demand signal is generated. The additional torque necessary for adequately raising fluid pressure is determined in accordance with the demand signal and an engine output torque is determined as the sum of the sensed torque demand and the determined additional torque. An engine speed controller controls the rotary speed of the output shaft by changing the effective diameter of a movable pulley of the CVT responsive to a transmission signal. An engine speed processor, in turn determines an engine speed of optimum efficiency in accordance with the determined engine output torque and the sensed vehicle speed and outputs a transmission signal indicative of the determined engine speeds. The output power of the internal combustion engine is controlled by controlling fuel feed thereto responsive to the transmission signal.

In contrast to the prior art, the present system requires only one pump/motor in the primary drivetrain and uses the hydraulic subsystem in such a way as to utilize a very small prime engine and keeps the engine on as much as possible.

The invention is a unique type of "parallel" system, but can operate in a series configuration as well. The system of the present invention includes a very small engine sized near the average power requirement rather than the peak power requirement. The hydraulic subsystem acts as a power-trimming device to "trim" the power demand experienced by the engine. That is, the hydraulic subsystem's main purpose is to keep the engine operating as close as possible to its peak efficiency, by placing additional load on the engine at times of low propulsion power demand and delivering additional power at times of high or peak propulsion power demand. In the present invention a single hydraulic pump/motor and an accumulator achieve both functions. To place additional load on the engine, the engine is run at a power level corresponding to peak efficiency and the excess power is routed through the hydraulic pump/motor (operating as a pump) into the accumulator where it is stored with very little energy loss. To deliver additional power, the stored energy is discharged to the powertrain through the hydraulic pump/motor (operating as a motor).

In its simplest configuration, a clutching arrangement between the transmission and wheels allows free-wheeling when no power is needed from the powertrain. However, for simplicity, no clutching is provided between the engine, hydraulic pump/motor, and transmission. Therefore, the engine may occasionally be motoring while the pump/motor is charging the accumulator during regenerative braking or when delivering small amounts of power by itself. This creates a drag on the power train that reduces efficiency somewhat. The friction losses associated with this arrangement are minimal due to the small displacement of the internal combustion engine and the small amount of time in this mode of operation.

The present invention includes at least two configurations for hydraulic regenerative braking. In the first embodiment, friction brakes are activated first, after which hydraulic braking is phased in. This method reduces the sophistication of the controls that would be needed to effect a smooth routing of power from the wheels, and allows safety in case of a hydraulic system failure. In the second embodiment, hydraulic braking occurs first with friction brakes added as a backup system. This second embodiment is somewhat more complex to control, but is the preferred embodiment because it maximizes the recovery of braking energy.

When accelerating from a stop, the engine provides power to the wheels through the non-hydraulic portion of the driveline. If more power is needed than the engine can provide, additional power is supplied by the pump/motor acting as a motor. The accumulator is of sufficient size to allow this additional power to be provided two or more times in succession. Accumulator capacity for at least one acceleration is needed for regenerative braking and capacity for another is needed as backup in case a stop does not allow regenerative braking.

When cruising speed is reached and power demand drops off to a low level, the engine output matches the road load because the engine is small enough that its peak efficiency corresponds to loads characteristic of average road load. If more power is required of the engine in order to maintain peak operating efficiency, an additional load is provided by charging the accumulator through the pump/motor acting as a pump. If the accumulator can accept no more charge, the pump/motor is set to zero displacement and the engine merely runs at a reduced power output. Since the engine is sized close to the average power load during cruising, there is little or no sacrifice in efficiency at this setting. The engine can also be turned off and the accumulator can drive the pump/motor acting as a motor, if the load is very low as would occur in low speed, stop and go traffic.

When braking occurs, and if there is sufficient unused storage capacity reserved in the accumulator, regenerative braking occurs where the pump/motor acts as a pump to charge the accumulator. If there is no capacity left in the accumulator, friction brakes are used. The system is managed so that there will normally be sufficient capacity available for regenerative braking.

If sudden acceleration is required during a cruising period, this may be provided by boosting the output of the engine along the best efficiency line. After the maximum efficient engine power output point is reached, the hydraulic subsystem is activated to retrieve additional power from the accumulator via the pump/motor.

When the car creeps along at a very low speed, as in a traffic jam, the engine is turned off and the pump/motor and accumulator are used to drive the car. This is better than using the engine alone in such a mode because a pump/motor can operate at a good efficiency even at low speeds and low power demands.

Through proper choice of component sizes and control system optimization, the system can be designed to optimize various goals. For instance, one could minimize the chance of either: a) encountering a fully charged accumulator when regenerative braking energy becomes available, or b) depleting the accumulator by several rapid accelerations without chance to recharge the accumulator.

The use of a small engine supplemented by an accumulator of finite energy storage capacity presents a difficulty in ascending long grades. Just as with acceleration, ascending a grade requires an unusually large amount of power, but unlike an acceleration a long grade requires this power for an extended period of time. Since the theory of operation of the invention is to provide a large portion of acceleration power by means of a hydraulic accumulator, a long grade would deplete the accumulator in short order and the vehicle would be left with insufficient power.

As an alternative to an extremely large accumulator capacity, a second engine, which can be inexpensive and of only moderate durability due to its occasional use, may be clutched in to supplement the power of the primary engine and pump/motor for an unlimited time.

DESCRIPTION OF THE PREFERRED EMBODIMENTS

Figure 1:
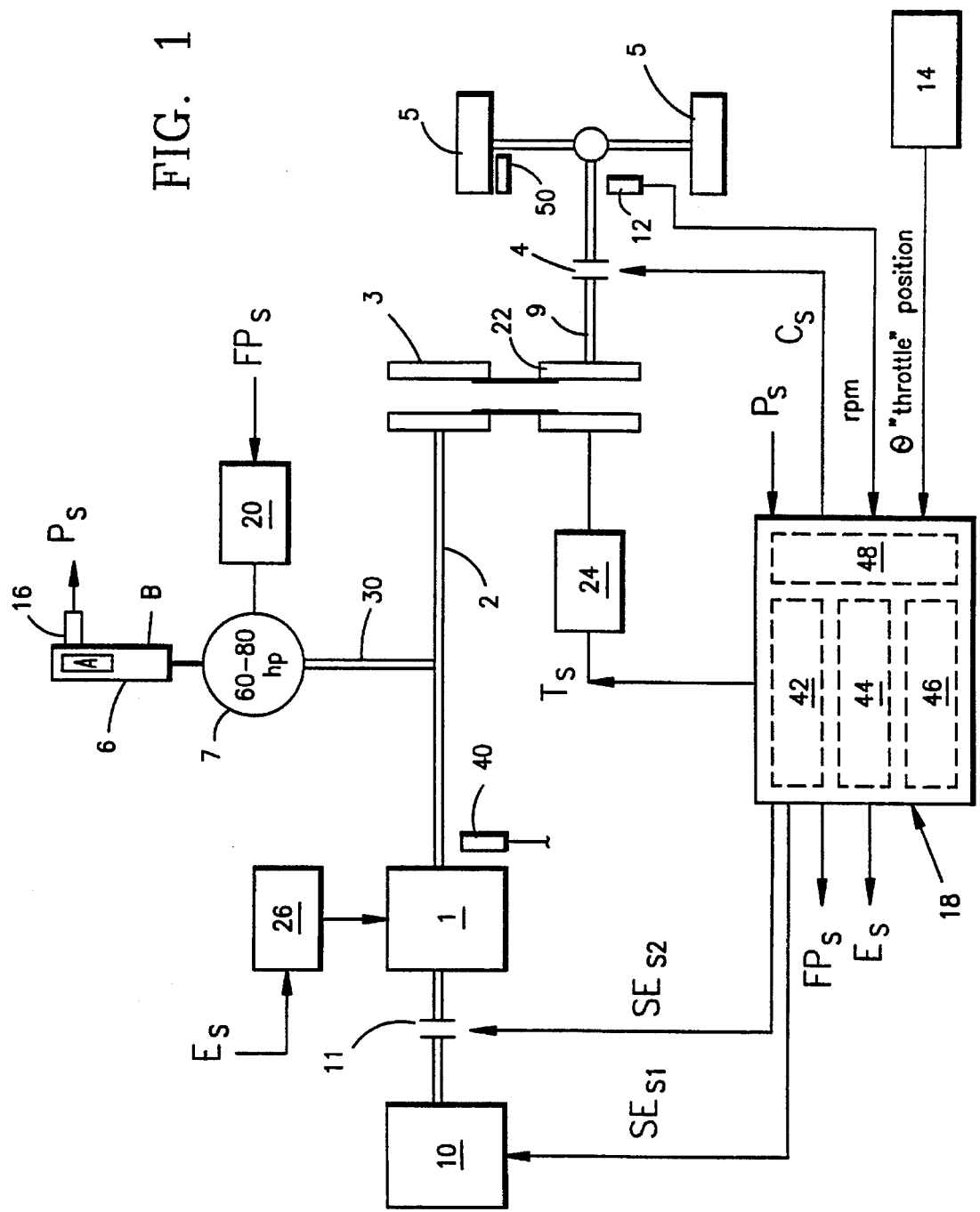
FIG. 1 is a schematic diagram of a first embodiment of a vehicle equipped with a hybrid powertrain propulsion system of the present invention.

FIG. 1 illustrates an embodiment of the present invention suitable for driving a three to four thousand pound vehicle. A very small internal combustion engine 1 (e.g. 20 hp) provides energy to the system. The energy is transmitted along the driveshaft 2, which constitutes a first drivetrain, and can be routed either to the transmission 3, in this embodiment a continuously-variable transmission (CVT), or to the pump/motor 7 (acting as a pump in the second mode) or both. The pump/motor 7 is a reversible hydraulic displacement device, e.g. a swash plate pump in which flow reversal is inherent to the pump or a bent axis pump wherein flow reversal is by valving external to the pump, capable of operating either in a first mode as a motor or in a second mode as a pump. The pump/motor 7 has a variable displacement. Energy routed to the pump/motor 7 (acting as a pump) is used to pump fluid to the accumulator 6, pressurizing the fluid B against a volume of gas A. Energy routed to the transmission flows along the lower driveshaft 9 past the freewheel clutch 4 to the wheels 5. The pump/motor 7 is switched between its first and second modes and its displacement is varied by a pump/motor controller 20, responsive to a signal FPs.

When the power demanded at the wheels 5 is larger than the power deliverable by the engine 1 alone, additional power is provided by the pump/motor 7 (acting as a motor in the first mode). In this mode the pressurized fluid in the accumulator 6 flows to the pump/motor 7 (acting as a motor), creating mechanical power that flows along the drive shaft 30 to driveshaft 2, to the transmission 3 and flows to the wheels as already described. The hydraulic accumulator 6, pump/motor 7 and shaft 30 constitute a second drivetrain, "parallel" to the first drivetrain.

Indicated at 26 is an engine control device, e.g. a fuel injection pump, which controls fuel feed to the engine 1, responsive to a signal Es which is a function of engine speed. Signal Es may be computed by processor 18 or may be a signal received directly from an rpm sensor 40.

The control hardware for operation of the vehicle includes a vehicle speed sensor, e.g. rpm sensor 12, which detects the rotational speed of the drive shaft downstream of the freewheel clutch 4, a pressure sensor 16 for detecting the pressure within the fluid pressure accumulator 6 and generating a signal Ps representative of the detected pressure and a power demand sensor 14, e.g. a sensor for detecting position of the "accelerator pedal." A first processor 42 receives the signal Ps representative of the fluid pressure detected by sensor 16 and compares that detected fluid pressure with a predetermined minimum fluid pressure and generates a demand signal FPs upon determination that the sensed fluid pressure is below the predetermined minimum fluid pressure. That demand signal FPs is sent to the pump controller 20 for conversion of the pump/motor 7 to the second mode for operation as a pump, to store energy in the accumulator 6 in the form of fluid pressure.

A second processor 44 determines an additional power in accordance with the demand signal FPs and an engine output power as the sum of the power demand sensed by 14 and the determined additional power. A third processor 46 determines the engine speed of optimum efficiency in accordance with the determined total engine output power, and with the sensed vehicle speed outputs a transmission signal Ts, indicative of the determined optimum engine speed to the engine speed controller 24. Controller 24 regulates engine speed responsive to the signal Ts by changing the effective diameter of pulley 22 of the CVT 3. Processors 42, 44 and 46 may optionally be combined into a single microprocessor 18 including a memory 48. The signal Ts is determined by reference to a two dimensional map stored in memory 48 wherein values for optimum efficient power and engine speed are correlated. Knowing the desired engine speed and the vehicle speed from sensor 12, signal Ts is computed. This control system is likewise applicable to the other embodiments described hereinbelow.

An optional secondary engine 10 can provide yet additional reserve power. In this case an electronically controlled clutch 11 is engaged through which the power from engine 10 feeds into the system. The secondary engine 10 provides backup power for severe or repeated accelerations and for continuous operation to maintain speed up long and/or steep grades. The secondary engine 10 and clutch 11 can be installed as shown (to supply power to the drive shaft 2) or to supply power to drive shaft 9 directly. The engine 10 may be electronically started and clutch 11 engaged responsive to a signal SEs generated as a function, for example, of the sensed "accelerator pedal" position and detected accumulator fluid pressure. The clutch 11 serves to engage the secondary engine at the output speed of the primary engine. The primary engine 1 and the secondary engine 10, in combination, might be regarded as the functional equivalent of a variable displacement engine.

When zero power is demanded at the wheels, the vehicle is changed over to a coasting mode, responsive to a signal Cs from the microprocessor 18, by disengagement of the freewheeling clutch 4. In this manner the vehicle is isolated from rotational friction losses in the drivetrain so that all of the kinetic energy of the vehicle is available for overcoming rolling resistance and aerodynamic drag. The clutch 4 is normally engaged and is disengaged only when zero power demand is detected by sensor 14.

When the driver brakes, regenerative braking occurs. Kinetic energy is transferred from the wheels 5 past the clutch 4 through the transmission 3 along the drive shaft 2 into the pump/motor 7 (acting as a pump). The pump/motor 7 pressurizes fluid and thereby stores the energy in the accumulator 6 in the same manner as described above.

Through fluid pressure in accumulator 6, the pump/motor 7, operating in its first mode as a motor may be used to start engine 1, thereby eliminating need for a conventional starter motor.

The operation of the invention will be more clearly understood in reference to FIGS. 2A–2D. In the following discussion the term "optimum efficiency" refers to a range of speed and load, i.e. (power) at which the efficiency of the engine 1 is deemed reasonably near its optimum efficiency, between points A and B.

Figure 2A:
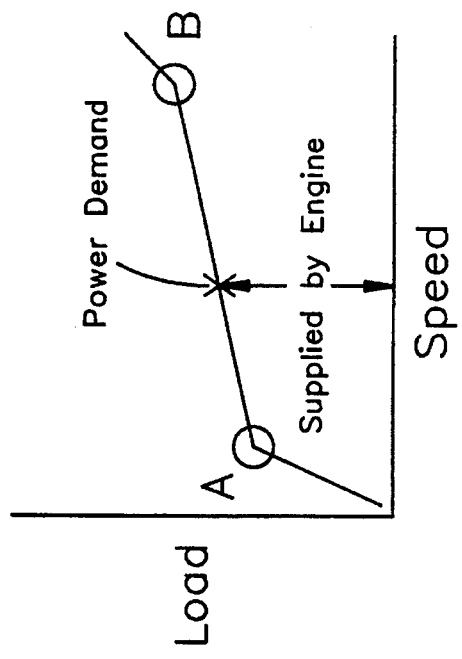
FIGS. 2a, 2b, 2c and 2d are graphs of engine load versus engine speed in various modes of operation of the system depicted in FIG. 1.

FIG. 2A is a graph which represents instances (Mode 1) when the power demanded is greater than that deliverable at optimum efficiency by the engine 1 (point B) in the embodiment of FIG. 1. In this case, that portion of load which exceeds B is provided by the pump/motor 7 (acting as a motor), while the engine 1 provides the rest. In embodiments where the engine and pump/motor shafts are not clutched or geared, the engine 1, pump/motor 7, and transmission 3 input shaft would operate at the same speed. A clutching arrangement or a gear reduction could be incorporated therein without changing the basic function of this mode.

Figure 2B:
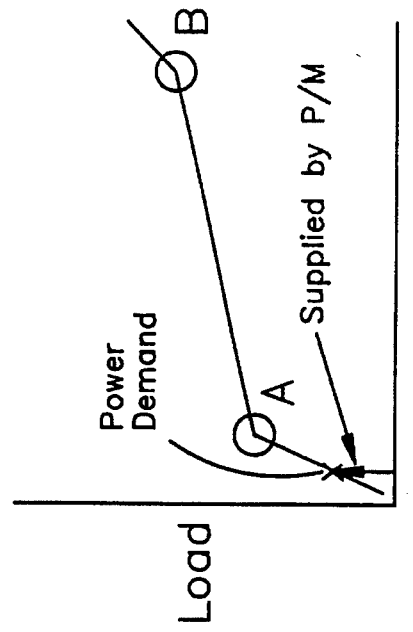

FIG. 2B illustrates the operation of the system of FIG. 1 in a mode 2, i.e. when power demanded of engine 1 is within the range of optimum efficiency (between power levels A and B). This power demanded of engine 1 is determined by microprocessor 18 considering power demanded by driver 14 and whether power should be supplied to or extracted from the accumulator 6. If there is no need to replenish the accumulator 6, all of the power is provided by the engine 1, and the pump/motor 7 is stroked to zero displacement (i.e., neutral position) by controller 20 where it neither pumps fluid into the accumulator 6 nor provides power to the system.

Figure 2C:
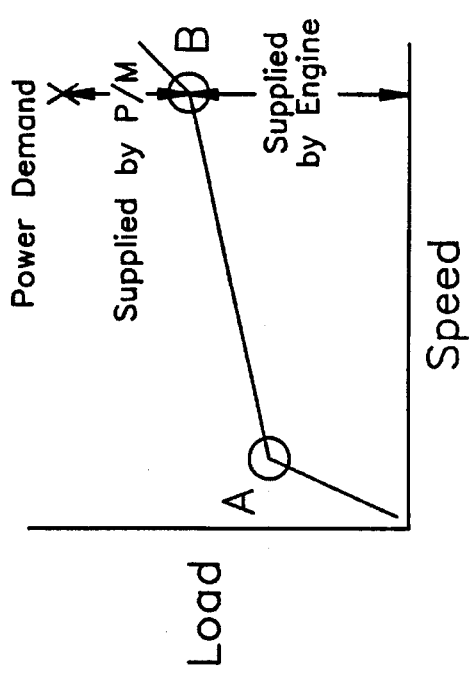

FIG. 2C illustrates the situation where the engine 1 can satisfy the driver power demand, and there is need (i.e., the accumulator energy level has reached a predetermined minimum level, but the engine 1 can operate at an optimum power level, point (b)) or desire (i.e., need to operate the engine at its optimum efficiency as indicated by driver power demand point (a)) to replenish the accumulator (mode 3). While road load demanded is represented by either of the points (a) or (b) shown in FIG. 2C, the power output of the engine is increased along the optimum efficiency line to a point at which sufficient excess power is generated, illustrated here by the point (c). The excess power that does not go to road load is fed into the pump/motor 7 (acting as a pump) which stores it in the accumulator 6 for future Mode 1 or Mode 4 events.

Figure 2D:
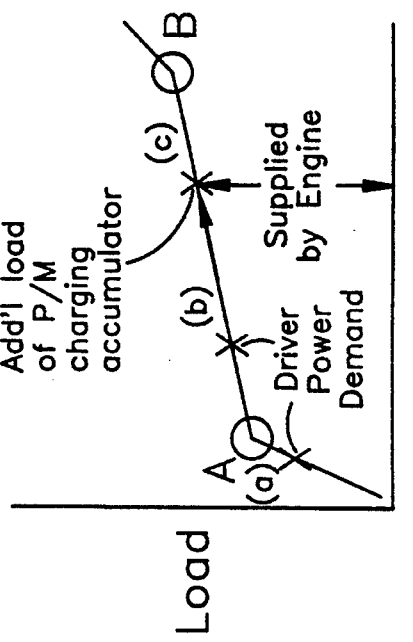

FIG. 2D illustrates mode 4 wherein an unusually small road load is experienced. In this case, the engine cannot deliver such a small amount of power at acceptable efficiency and significant pressure exists in the accumulator 6. The fuel flow to the engine 1 is turned off, and the pump/motor 7 (acting as a motor) provides power by itself.

Regenerative braking can be thought of as an extension of Mode 4 (FIG. 2D), in which power demand is zero and the vehicle must decelerate at a rate greater than rolling resistance and aerodynamic drag would provide. The driver activates the brakes, which in turn activate the pump/motor 7 (acting as a pump) which pressurizes fluid as previously described using the vehicle's kinetic energy taken through the drive shaft 2, transmission 3 and lower drive shaft 9. This results in a deceleration similar to that caused by friction braking, but the energy is saved in the accumulator 6 rather than discarded.

Figure 3:
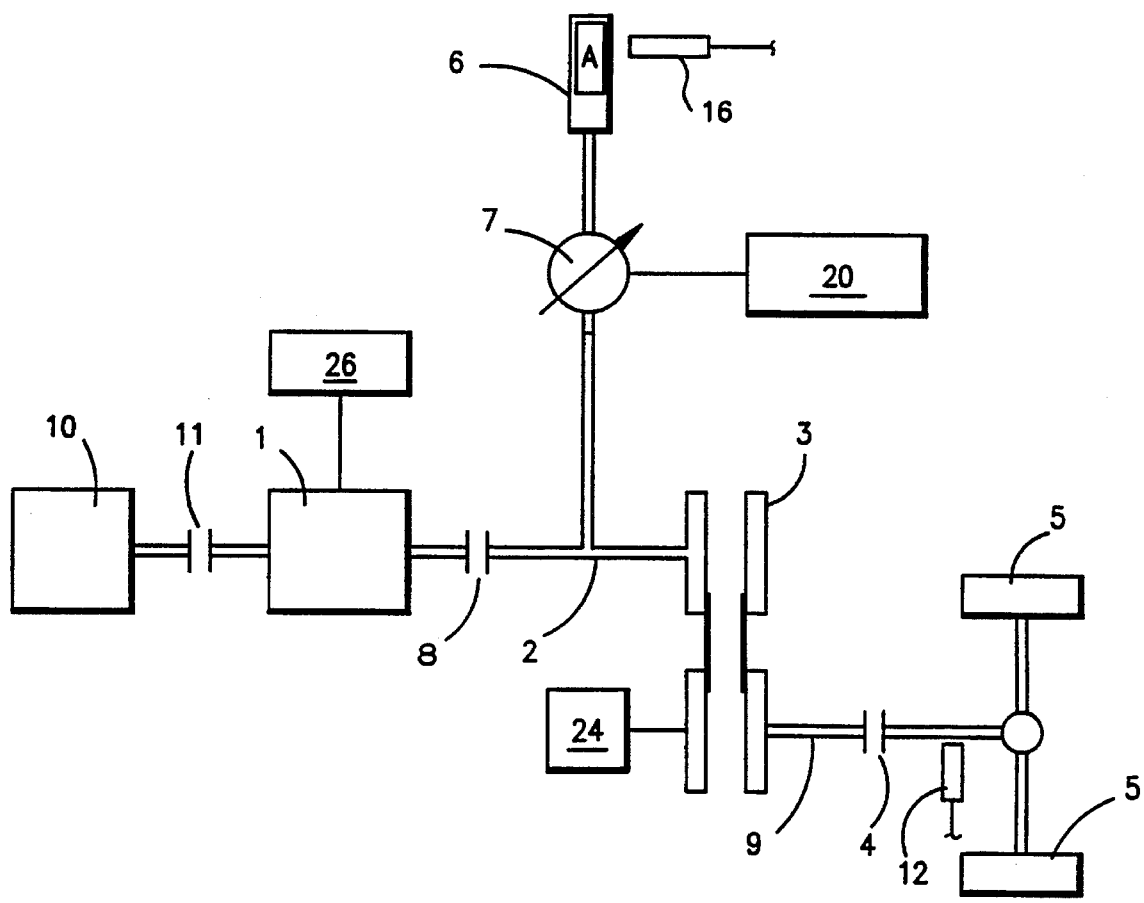
FIG. 3 is a schematic illustration of a vehicle equipped with a second embodiment of a hybrid powertrain propulsion system in accordance with the present invention.

An alternate embodiment adapted for operation which is expected to involve more extensive stop and go driving is shown in FIG. 3. In continual stop and go driving, a mode is invoked in which the pump/motor directly drives the vehicle without assistance from the engine. In this case a clutch 8 is provided between the engine 1 and pump/motor 7 so as to disconnect the engine 1 in this mode and prevent friction associated with operation of the engine 1.

Figure 4:
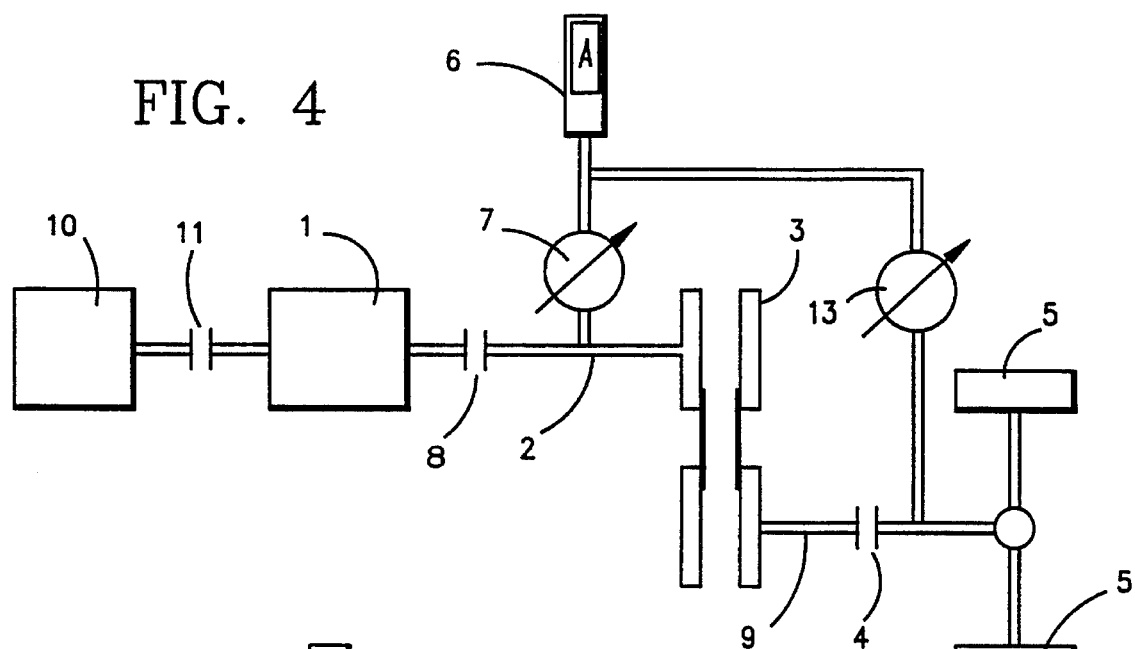
FIG. 4 is a schematic illustration of a vehicle equipped with a third embodiment of a hybrid powertrain propulsion system in accordance with the present invention.

Yet another embodiment is shown in FIG. 4, wherein a second pump/motor 13 is provided between the transmission and the wheels. This configuration would allow regenerative braking energy to proceed through the second pump/motor 13 directly to the accumulator 6 without incurring frictional losses in passing through the transmission 3. If the drag of the second pump/motor 13 when in neutral is sufficiently low, the second pump/motor 13 can stay on line directly geared to the wheel drive 9 during all modes of driving. An option to eliminate this "in neutral" drag would be to add a clutch between 15 the second hydraulic pump/motor 13 and the wheel drive 9. Since the second pump/motor 13 can also provide power to the wheels in acceleration and cruising modes, it allows the size of the first pump/motor 7 to be reduced. The smaller size of pump/motor 7 allows the pump/motors to be selectively operated so as to better match the size of the chosen motor to the power being demanded by the wheels, improving average efficiency. This is especially important for urban driving where low and modest accelerations are frequent driving modes and a smaller pump/motor 7 can supplement the primary engine 1 more efficiently for small power increments than a larger pump/motor. The addition of the second pump/motor 13 to handle high acceleration rates and steep, extended grades would also allow a significantly smaller transmission, which is especially important for CVTs. For steep grades, engine 10 could be activated and the pump/motor 7 could operate as a pump driving the pump/motor 13 as a motor. Alternatively, a pump could be attached to engine 10, eliminating clutch 11, to supply sustained power through pump/motor 13 as a motor.

Figure 5:
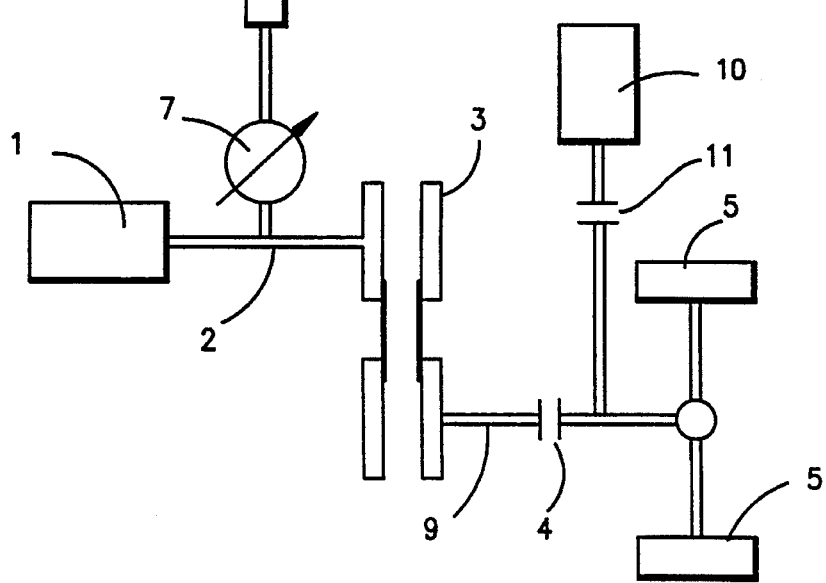
FIG. 5 is a schematic illustration of a vehicle equipped with a fourth embodiment of a hybrid powertrain propulsion system in accordance with the present invention.

Another embodiment shown in FIG. 5 includes the second engine 10 clutched directly into the drive shaft 9 either upstream or downstream of the free wheel clutch 4, rather than behind the primary engine 1 as in the embodiments of FIGS. 1, 3, and 4. This arrangement allows the energy produced by the second engine 10 to pass directly to the wheels 5 without incurring losses in the upstream components of the drive line, and allows a smaller transmission 3 and, if downstream, a smaller free wheel clutch 4. In either location, the second engine 10 supplies power for various purposes, including but not necessarily limited to providing additional power for sustained hill-climbing, providing additional acceleration power during times of extremely hard acceleration, providing emergency launching power in the case of accumulator depletion, providing backup power for normal acceleration in order to allow a reduced accumulator or pump/motor size, and for selective operation so as to better match the size of the chosen engine to the road load demand.

One possible modification of the embodiment shown in FIG. 3 would be to delete the transmission 3 and launch the vehicle with the pump/motor 7 through appropriate use of the free wheel clutch 4.

A possible modification of the embodiment shown in FIG. 4 would be to delete the transmission 3 (and optionally clutch 12) and add a clutch between the pump/motor 13 and the wheel drive 9. The vehicle would be launched with either the pump/motor 7 (retaining clutch 8) or the pump/motor 13. At vehicle speeds above a specified minimum (e.g. 20 miles per hour), engine i would be engaged and provide direct shaft power, and operation would proceed as previously described. This configuration would eliminate any risk of accumulator pressure depletion.

Figure 6:
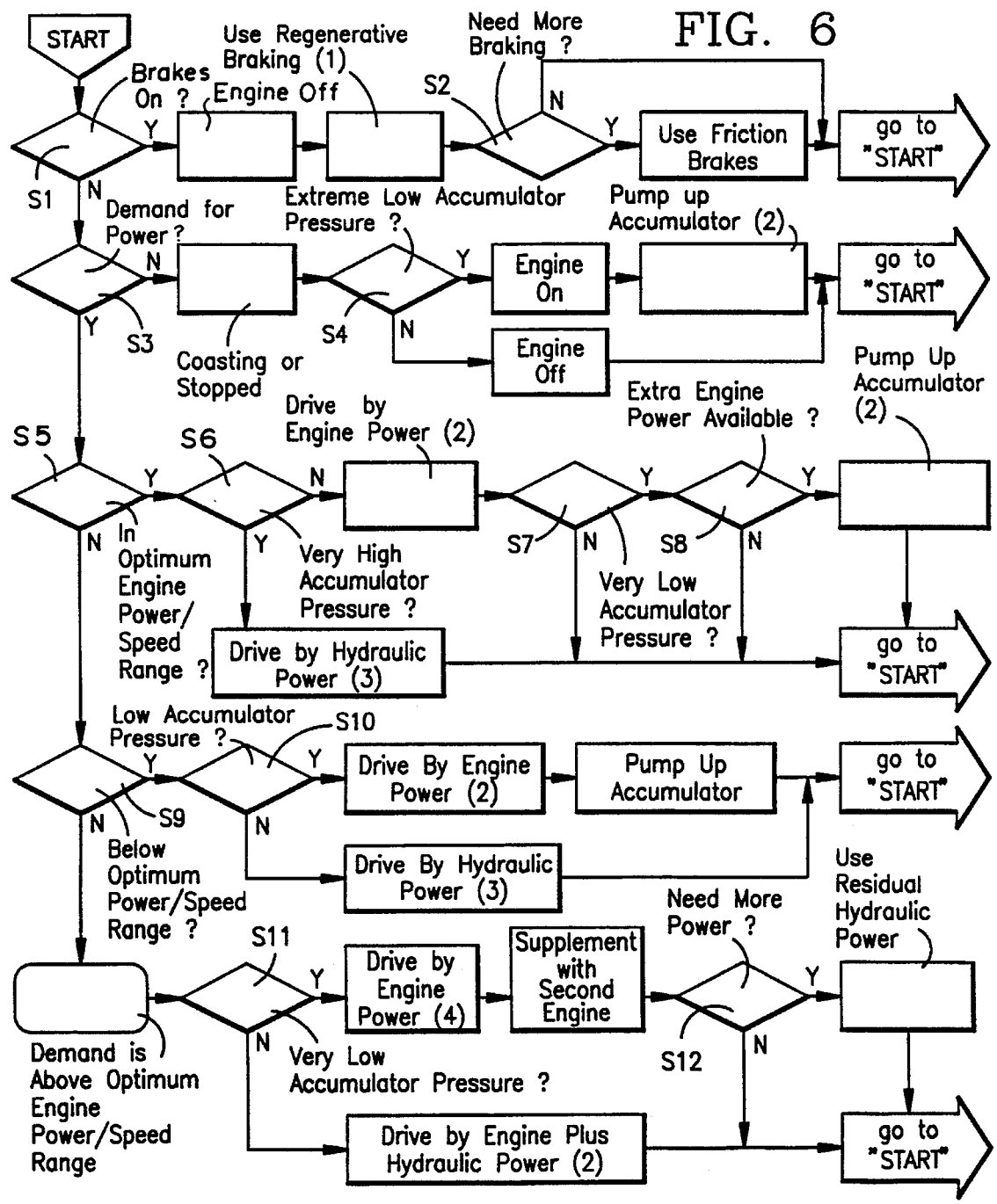
FIG. 6 is a logic flow diagram for control of operation of a vehicle by a microprocessor in accordance with the present invention.

The logic flow for control by microprocessor 18 will now be described with reference to FIG. 6 of the drawings. FIG. 6 is a flow chart showing the flow of control processing by microprocessor or computer unit 18. At step S1 a determination is made in accordance with a signal from brake sensor 50 as to whether or not brakes are engaged. If the brakes are engaged (Y), the engine 1 is shutoff or disconnected to allow for regenerative braking with pump/motor 7 operating as a pump to convert the energy of the braking into fluid pressure stored in accumulator 6. At step S2 a determination is made as to whether or not braking in addition to the regenerative braking is required. If required, friction brakes are engaged. In step S3 a determination is made, in accordance with the signal from sensor 14, as to whether or not power is demanded by the driver. If no power is demanded, processing continues to step S4 where accumulator pressure, determined as a function of the signal from sensor 16, is compared with a predetermined minimum value for accumulator pressure and, if below that predetermined value, the engine is allowed to remain running with pump/motor 7 operating as a pump to convert the engine power into stored energy in the form of fluid pressure. If the pressure comparison of step S4 determines that the sensed fluid pressure is above the predetermined minimum, the engine is shut-off or disconnected and the control processing cycle is restarted. If a determination is made in step S3 that power is demanded by the driver, the control processing proceeds to step S5 wherein a determination is made as to whether or not the engine is operating at optimum efficiency for the demanded output power and vehicle speed. This determination is made by reference to a map or curve for optimum efficiency on a plot of engine output torque (i.e., load) versus vehicle speed (each point on the curve represents a unique power level) stored in memory 48. If it is determined in step S5 that the engine i is operating within a range of optimum efficiency, control processing proceeds to step S6 where a determination is made as to whether or not the sensed fluid pressure is at or above a predetermined very high value for fluid pressure. If the fluid pressure is found to be above the predetermined very high value in step S6, the power demanded by the driver is supplied by operation of pump/motor 7 as a motor operated by fluid pressure released from accumulator 6. If the accumulator or fluid pressure is not at the predetermined very high value the control processing proceeds to step S7 wherein the sensed fluid pressure is compared against the predetermined very low value for fluid pressure and, if below that predetermined low value, processing proceeds to step S8 where determination is made as to the availability of additional engine power and, if additional engine power is available, that additional engine power is used to store additional fluid pressure in the accumulator with operation of pump/motor 7 as a pump. If the sensed fluid pressure is not below the predetermined very low value in S7 or if no engine power is determined to be available in step S8, the control processing returns to start. If, in step S5, it is determined that the engine 1 is not operating within a range of optimum efficiency, control processing proceeds to step S9 where determination is made as to whether or not the engine is operating at a range below optimum efficiency. If the determination in step S9 is positive, processing proceeds to step S10 where the sensed fluid pressure is compared against a predetermined low value for fluid pressure and, if below that predetermined low value, engine power is increased and pump/motor 7 operates as a pump to increase fluid pressure within accumulator 6. If, in step S10, it is determined that accumulator pressure is not "low" the demand for power is satisfied by driving the powertrain with operation of pump/motor 7 as a motor driven by fluid pressure released by accumulator 6.

If, in step S9, it is determined that the engine is not operating below the range for optimum efficiency, i.e. is operating above the range for optimum efficiency, processing proceeds to step S11 wherein the sensed fluid pressure is compared against a predetermined "very low" value for fluid pressure. If found to be below that "very low" value for fluid pressure in step S11, the secondary engine 10 is started and clutch 11 (in the embodiment of FIG. 1) is engaged so that both engines operate in series to drive the vehicle. If the determination in step S11 is positive the processing proceeds to step S12 where a determination is made as to a need for more power. If a need for additional power is determined, the pump/motor 7 is operated as a motor to provide that additional power. If, in step S11, a determination is made that the sensed fluid pressure is above the predetermined "very low" value for fluid pressure, the secondary engine is not started and, instead, the vehicle is driven by the primary engine 1 and pump/motor 7 operating as a motor.

The notes for FIG. 6 read as follows:

[1] Set Continuously Variable Transmission (CVT) ratio and hydraulic pump displacement to achieve desired degree of braking, up to drive wheel slippage.

[2] Set CVT ratio to achieve optimum engine speed/power.

[3] Set CVT ratio and hydraulic motor displacement to achieve optimum efficiency power.

[4] Set CVT ratio to achieve engine speed for maximum power.

The invention may be embodied in other specific forms without departing from its spirit or essential characteristics. The present embodiments are, therefore, to be considered in all respects as illustrative and not restrictive, the scope of the invention being further indicated by the claims rather than limited by the foregoing description, and all changes which come within the meaning and range of the equivalents of the claims are therefore intended to be embraced therein.

We claim:

1. A hybrid powertrain vehicle comprising:

a vehicle frame;

drive wheels rotatably mounted on said vehicle frame;

a primary engine, mounted on said vehicle frame, for providing engine power by rotation of an output shaft;

power storage means, mounted on said vehicle frame, for storing and releasing power generated by said primary engine;

first drive train means for transmitting said engine power to said drive wheels, said first drive train means including a transmission having adjustable speed input and output;

reversible means for selectively, while driven by said rotation of said engine in a first mode, transmitting said engine power to said power storage means or, operating as a motor in a second mode, transmitting stored power from said power storage means to said first drive train;

second drive train means, in parallel with at least a portion of said first drive train means, connecting said reversible means to said first drive train means, for, in said second mode, transmitting said stored power to said first drive train means and for, in said first mode, transmitting said rotation of said engine to said reversible means for transfer of a portion of said engine power to said power storage means simultaneously with transfer of the remainder of said engine power to said drive wheels;

vehicle speed sensor means for sensing vehicle speed;

stored power sensor means for sensing a quantity of power stored within said power storage means;

power demand sensing means for sensing power demanded of the vehicle by a driver;

comparing means for comparing said sensed quantity of stored power with a predetermined minimum amount of stored power and generating a demand signal upon determination that said sensed quantity is below said predetermined amount;

power output determining means for determining an additional increment of power in accordance with said demand signal and for determining an engine output power as a sum of the sensed power demand and the additional increment of power;

engine speed control means for controlling speed of said rotation of said output shaft by changing the input speed of said transmission responsive to a transmission signal;

engine speed determining means for determining an engine speed of optimum efficiency in accordance with said determined engine output power and said sensed vehicle speed and for outputting the transmission signal, indicative of the determined engine speed, to said engine speed control means;

engine load control means for controlling said engine power by controlling fuel feed to said primary engine responsive to said transmission signal; and mode control means for converting operation of said reversible means between said first and second modes responsive to the demand signal.

2. A hybrid powertrain vehicle according to claim 1 further comprising:

a secondary engine;

a secondary engine clutch for connecting an output of said secondary engine to said first drive means responsive to the sensed power demand.

3. A hybrid powertrain vehicle according to claim 2, wherein said comparing means compares the sensed power demand with a maximum power predetermined for said primary engine and generates a command signal for starting said secondary engine and for engaging said secondary engine clutch when said sensed power demand exceeds said predetermined maximum power.

4. A hybrid powertrain vehicle according to claim 3, wherein said command signal is generated only upon determination that said sensed quantity of stored power is below said predetermined amount.

5. A hybrid powertrain vehicle according to claim 1 further comprising a freewheel clutch interposed between said transmission and said drive wheels for disengaging said drive wheels from said first drive train responsive to a signal indicative of zero sensed power demand.

6. A hybrid powertrain vehicle according to claim 1 further comprising a memory containing a stored map correlating values for said optimum engine speed and engine output power; and wherein said engine speed determining means applies said determined engine output power and said sensed vehicle speed to said map to determine the engine speed of optimum efficiency.

7. A method for controlling a vehicle equipped with the hybrid powertrain propulsion system including drive wheels, reversible drive means, a primary engine for rotatable driving said drive wheels and said reversible drive means simultaneously in parallel, power storage means for storing engine power generated by said primary engine, a transmission having adjustable speed input and speed output and engine speed control means for changing the input speed of said transmission, said method comprising:

sensing vehicle speed;

sensing a quantity of power stored within the power storage means;

sensing power demanded of the vehicle by a driver;

feeding power from the power storage means, through the reversible drive means, utilizing the reversible drive means as a motor for driving said drive wheels responsive to a signal indicating a demanded power above that output by the primary engine;

simultaneously (1) transmitting a portion of the output power of the primary engine into said power storage means, using said reversible drive means, responsive to a sensed quantity of stored power lower than a predetermined value and (2) transmitting the remainder of the output power of the primary engine to the drive wheels;

comparing the sensed quantity of stored power with a predetermined minimum value and generating a demand signal upon determining that the sensed quantity of stored power is below the predetermined low value;

determining an additional output power in accordance with the demand signal and determining an engine output power as the sum of the sensed power demand and the additional output power;

controlling the rotary speed of the primary engine by changing the input speed of the transmission responsive to a transmission signal; and determining an engine speed of optimum efficiency in accordance with the determined engine output power and the sensed vehicle speed and outputting the transmission signal in accordance with the determined engine speed.

8. The method of claim 7 wherein said propulsion system includes a memory containing a stored first map correlating values for optimum engine speed and determined engine output power, and a second map correlating values for vehicle speed and said transmission signals, each of said transmission speeds representing a transmission speed (gear) ratio to achieve optimum engine speed; and wherein said determining of optimum engine speed is by applying the determined engine output power and a sensed vehicle speed to said maps to select an engine speed of optimum efficiency for said determined engine output power and said sensed vehicle speed and for setting said transmission signal.

9. A hybrid powertrain vehicle comprising:

a vehicle frame;

drive wheels rotatably mounted on said vehicle frame;

a primary engine, mounted on said vehicle frame, for providing engine power as rotation of an output shaft;

a fluid pressure accumulator, mounted on said vehicle frame, for storing and releasing fluid pressure;

first drive train means for transmitting said engine power to said drive wheels, said first drive train means including a continuously variable transmission having at least one pulley of variable effective diameter;

reversible fluidic displacement means for, in a first mode, operating as a motor fluidically driven by fluid pressure released by said accumulator, to output motor power to said first drive train and for, in a second mode, operating as a pump driven by said rotation of said engine, through said first drive train, to store said fluid pressure;

second drive train means, connecting said fluidic displacement means to said first drive train means, for, in said first mode, transmitting said motor power to said first drive train means and for, in said second mode, transmitting engine power to said fluidic displacement means;

vehicle speed sensor means for sensing vehicle speed;

pressure sensor means for sensing the fluid pressure within said accumulator;

power demand sensing means for sensing power demanded of the vehicle by a driver;

comparing means for comparing said sensed fluid pressure with a predetermined minimum fluid pressure and generating a demand signal upon determination that said sensed fluid pressure is below said predetermined fluid pressure;

power output determining means for determining an additional increment of power in accordance with said demand signal and for determining an engine output power as a sum of the sensed power demand and the additional increment of power;

engine speed control means for controlling rotary speed of said output shaft by changing the effective diameter of said pulley responsive to a transmission signal;

engine speed determining means for determining an engine speed of optimum efficiency in accordance with said determined engine output power and said sensed vehicle speed and for outputting the transmission signal, indicative of the determined engine speed, to said engine speed control means;

engine load control means for controlling said engine power by controlling fuel feed to said primary engine responsive to said transmission signal; and mode control means for converting operation of said fluidic displacement means between said first and second modes responsive to the demand signal and for varying the displacement of said fluidic displacement means responsive to the sensed fluid pressure.

10. A hybrid powertrain vehicle according to claim 9 further comprising:

a secondary engine;

a secondary engine clutch for connecting an output of said secondary engine to said first drive means responsive to the sensed power demand.

11. A hybrid powertrain vehicle according to claim 10, wherein said comparing means compares the sensed power demand with a maximum power predetermined for said primary engine and generates a command signal for starting said secondary engine and for engaging said secondary engine clutch when said sensed power demand exceeds said predetermined maximum power.

12. A hybrid powertrain vehicle according to claim 11, wherein said command signal is generated only upon determination that said sensed fluid pressure is below said predetermined fluid pressure.

13. A hybrid powertrain vehicle according to claim 9 further comprising a freewheel clutch interposed between said transmission and said drive wheels for disengaging said drive wheels from said first drive train responsive to a signal indicative of zero sensed power demand.

14. A hybrid powertrain vehicle according to claim 9 further comprising a memory containing a stored map correlating values for said optimum engine speed and engine output power; and wherein said engine speed determining means applies said determined engine output power and said sensed vehicle speed to said map to determine the engine speed of optimum efficiency.

15. A method for controlling a vehicle equipped with the hybrid powertrain propulsion system including drive wheels, a primary engine for powering the drive wheels, a reversible fluidic displacement means, an accumulator for accumulating fluid pressure, a continuously variable transmission having a moveable pulley of variable effective diameter and a controller for mechanically moving that pulley to change the effective diameter, said method comprising:

sensing vehicle speed;

sensing fluid pressure within the accumulator;

sensing power demanded of the vehicle by a driver;

feeding fluid pressure from the accumulator, through the reversible fluid displacement device, to utilize the reversible fluid displacement device as a motor for driving said drive wheels responsive to a signal indicating a demanded power above that output by the primary engine;

pumping fluid pressure into the accumulator, using a portion of the output power of the primary engine to drive the reversible fluid displacement means as a pump, responsive to a sensed fluid pressure lower than a predetermined value;

comparing the sensed fluid pressure with a predetermined minimum fluid pressure and generating a demand signal upon determining that the sensed fluid pressure is below the predetermined low fluid pressure;

determining an additional output power in accordance with the demand signal and determining an engine output power as the sum of the sensed power demand and the additional output power;

controlling the rotary speed of the primary engine by changing the effective diameter of the moveable pulley responsive to a transmission signal; and determining an engine speed of optimum efficiency in accordance with the determined engine output power and the sensed vehicle speed and outputting the transmission signal in accordance with the determined engine speed.

16. The method of claim 15 wherein said propulsion system includes a memory containing a stored first map correlating values for optimum engine speed and determined engine output power, and a second map correlating values for vehicle speed and said transmission signals, each of said transmission speeds representing a transmission speed (gear) ratio to achieve optimum engine speed; and wherein said determining of optimum engine speed is by applying the determined engine output power and a sensed vehicle speed to said maps to select an engine speed of optimum efficiency for said determined engine output power and said sensed vehicle speed and for setting said transmission signal.

* * * * *